(12) United States Patent
Lessard

(10) Patent No.: US 9,092,754 B1
(45) Date of Patent: Jul. 28, 2015

(54) MOBILE SCANNING FOR INVENTORY MANAGEMENT

(71) Applicant: EMC Corporation, Hopkinton, MA (US)

(72) Inventor: Christopher Lessard, Creedboor, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/319,590

(22) Filed: Jun. 30, 2014

(51) Int. Cl.
*G06F 19/00* (2011.01)
*G06Q 30/00* (2012.01)
*G06Q 90/00* (2006.01)
*G06Q 10/08* (2012.01)

(52) U.S. Cl.
CPC .................................. *G06Q 10/087* (2013.01)

(58) Field of Classification Search
CPC ......... G06F 19/00; G06F 17/00; G06Q 30/00; G06Q 90/00; G06K 7/10; G06K 19/00
USPC .............................. 235/385, 375, 462.01, 487
See application file for complete search history.

(56) References Cited

U.S. PATENT DOCUMENTS

| | | | | |
|---|---|---|---|---|
| 5,470,427 A | * | 11/1995 | Mikel et al. | 156/387 |
| 2006/0158866 A1 | * | 7/2006 | Peterson et al. | 361/796 |
| 2007/0190943 A1 | * | 8/2007 | Little | 455/41.2 |
| 2011/0153614 A1 | * | 6/2011 | Solomon | 707/740 |
| 2013/0144428 A1 | * | 6/2013 | Irwin et al. | 700/218 |

* cited by examiner

*Primary Examiner* — Edwyn Labaze
(74) *Attorney, Agent, or Firm* — Ryan, Mason & Lewis, LLP

(57) ABSTRACT

Each tag in a plurality of tags is respectively assigned to each equipment location in a plurality of equipment locations, wherein each tag comprises a scannable identifier unique to each location. A tag is assigned to a first equipment cabinet, wherein the tag comprises a scannable identifier unique to the first equipment cabinet. The first equipment cabinet is positioned at one of the plurality of equipment locations. The tag assigned to the location of the first equipment cabinet and the tag assigned to the first equipment cabinet are scanned, wherein scanning of the tags is performed via a mobile device comprising a scanner. An association is automatically created between the unique identifier of the location of the first equipment cabinet and the unique identifier of the first equipment cabinet.

16 Claims, 5 Drawing Sheets

100

| | SCAN DATE | SERIAL NUMBER | PART NUMBER | DEVICE | ASSET TAG | TILE TAG | BUILDING | LAB | TILE | SCAN USER |
|---|---|---|---|---|---|---|---|---|---|---|
| 402 → | 4/3/14 | JWXD12400388 | 100-5620712 | CABINET | EMC405744 | | DURHAM | L1 | 86BR | MURTAJ |
| 404 → | 4/3/14 | SAN00094205446 | 5048849 | 450 GB DRIVE | | LR-L1-86BR | DURHAM | L1 | 86BR | MURTAJ |
| 406 → | 4/3/14 | SAN00094205445 | 5048849 | 450 GB DRIVE | | LR-L1-86BR | DURHAM | L1 | 86BR | MURTAJ |
| 408 → | 4/3/14 | SAN00094205444 | 5048849 | 450 GB DRIVE | | LR-L1-86BR | DURHAM | L1 | 86BR | MURTAJ |

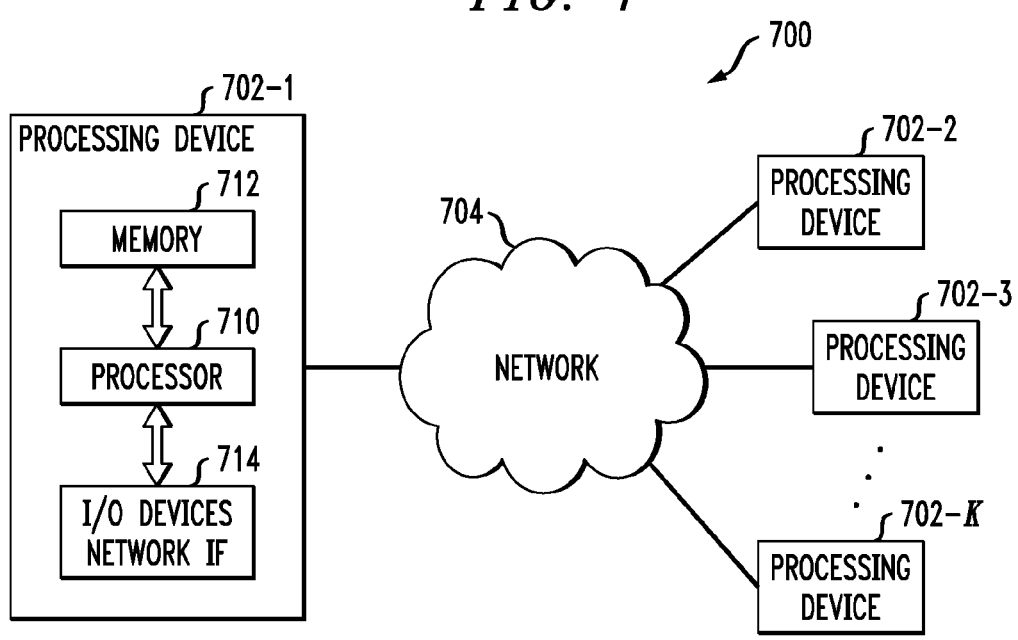

MOBILE SCANNING FOR INVENTORY MANAGEMENT

FIELD

The field relates to inventory management and, more particularly, to mobile scanning techniques for inventory management.

BACKGROUND

Inventory management of electronic equipment can be a very challenging task. Electronic equipment may include, for example, a rack (cabinet) with multiple rack mounted assets (racked assets) installed therein. The cabinet and racked assets may be located in a lab setting where the equipment is being tested and/or used for its intended purpose. For example, a cabinet may contain racked assets that include data storage devices or disks that are being powered on and run through reliability testing in a test lab. Alternatively, the lab could be a data center wherein the cabinet and racked assets are being used to service real-time customer requests. In either case, it is important to know where in the lab setting (which can be expansive and cover hundreds or thousands of square feet of floor space in one or more buildings or locations) a particular cabinet or a particular racked asset is located.

SUMMARY

Embodiments of the invention provide mobile scanning techniques for inventory management.

For example, in one embodiment, a method comprises the following steps. Each tag in a plurality of tags is respectively assigned to each equipment location in a plurality of equipment locations, wherein each tag comprises a scannable identifier unique to each location. A tag is assigned to a first equipment cabinet, wherein the tag comprises a scannable identifier unique to the first equipment cabinet. The first equipment cabinet is positioned at one of the plurality of equipment locations. The tag assigned to the location of the first equipment cabinet and the tag assigned to the first equipment cabinet are scanned, wherein scanning of the tags is performed via a mobile device comprising a scanner. An association is automatically created between the unique identifier of the location of the first equipment cabinet and the unique identifier of the first equipment cabinet.

Further, the method may further comprise assigning a tag to a first asset, wherein the tag comprises a scannable identifier unique to the first asset, installing the first asset in the first equipment cabinet, and scanning the tag of the first asset using the scanner of the mobile device. An association is automatically created between the unique identifier of the first asset and the unique identifier of the first equipment cabinet, and then the unique identifier of the location of the first equipment cabinet once the cabinet is positioned at the given location.

Advantageously, illustrative embodiments allow rack mounted assets (racked assets) to be associated with a master tag assigned to a floor tile on which an equipment cabinet containing the racked assets is located. Thus, all assets installed in a particular cabinet, including the cabinet itself, are associated with the master tag for easy and fast inventory management using scanning capabilities which are mobile. In one example, bar codes displayed on the tags are used as unique scannable identifiers and the scanner is a bar code reader.

These and other features and advantages of the present invention will become more readily apparent from the accompanying drawings and the following detailed description.

BRIEF DESCRIPTION OF THE DRAWINGS

FIG. 7 illustrates a processing platform utilized to implement a mobile scanning-based inventory management system according to one or more embodiments of the invention.

DETAILED DESCRIPTION

Illustrative embodiments of the invention will be described herein in the context of electronic equipment inventory management. However, it is to be appreciated that the mobile scanning techniques described herein can be implemented in inventory management environments other than those associated with electronic equipment.

Existing inventory management techniques used for electronic equipment tracking in a laboratory (lab) setting typically include manually tracking cabinets and racked assets whereby lab personnel manually input (type or write) some form of identification indicator for the cabinet or racked asset in an inventory list. Then, each time a cabinet or a racked asset is moved, the lab personnel have to manually input the same identification information in the list again for a new location. Since this is tedious and requires the lab personnel to note the identification indicator and then go search for the list each time, often the data entry is delayed and the inventory list is therefore not up-to-date. When the inventory list is not current, this results in a significant waste of time trying to physically locate equipment, especially when racked assets are moved between cabinets.

Illustrative embodiments provide mobile scanning techniques for inventory management that overcome the above and other drawbacks associated with existing inventory management approaches.

As illustratively used herein, the term "asset" refers to an inventory item, while the term "cabinet" refers to a support structure for one or more inventory items. The cabinet itself can also be an inventory item. A "racked asset" (or "rack mounted asset") is an asset that is installed or mounted on or in a cabinet.

Figure 1:
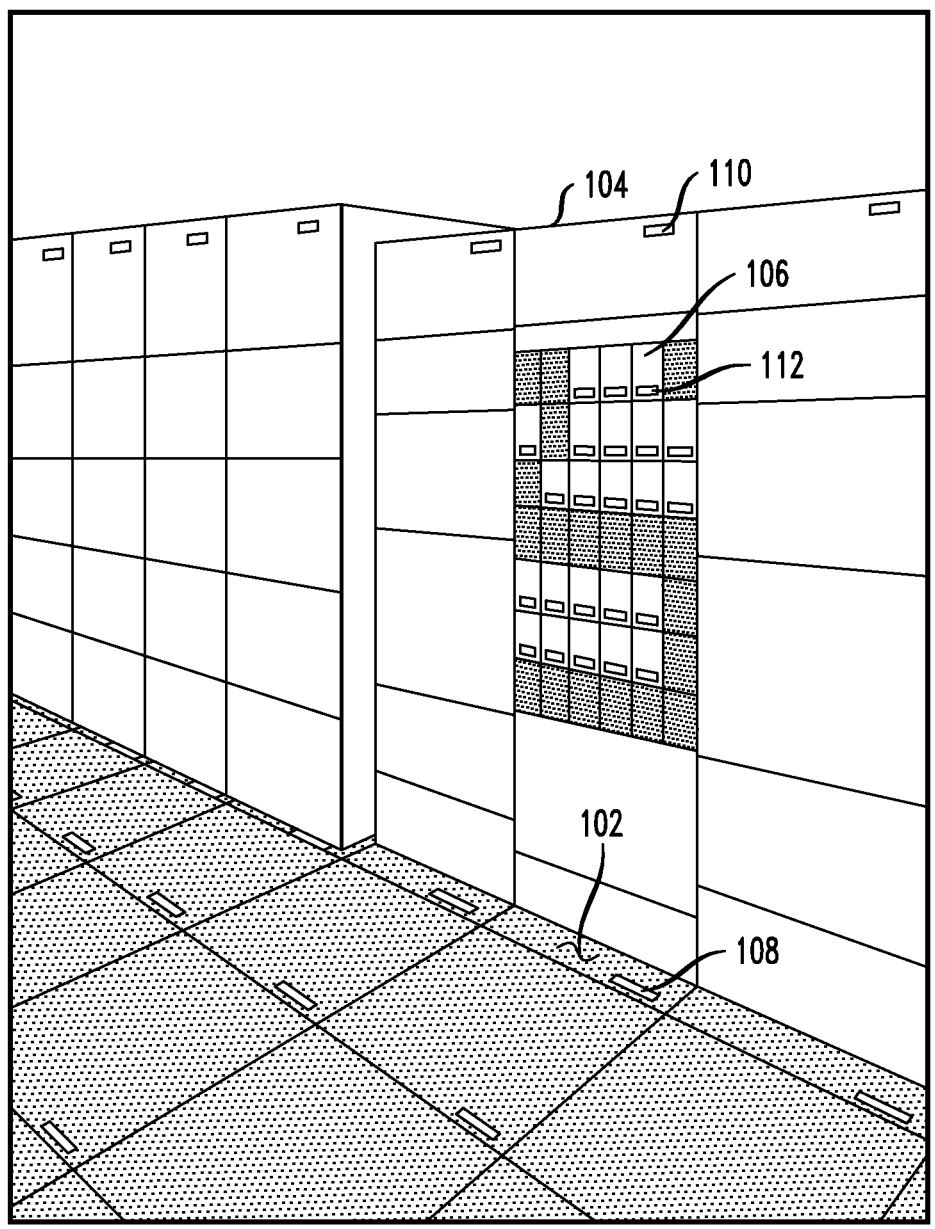
FIG. 1 illustrates a perspective view of a lab setting in which mobile scanning techniques for inventory management according to one or more embodiments of the invention are implemented.

FIG. 1 illustrates a perspective view of a lab setting in which mobile scanning techniques for inventory management according to one or more embodiments of the invention are implemented. In particular, FIG. 1 depicts a lab 100 with a floor comprised of a plurality of tiles 102. For example, the floor tiles 102 may be part of a raised computer floor arrangement where the floor tiles are typically squares (e.g., 2 feet by 2 feet) and are supported by a raised grid structure (not shown). The raised floor allows power and/or data cables to run underneath the floor tiles and through openings in the floor tiles into the electronic equipment cabinets for connection with the racked assets installed therein. For example, the racked assets may be data storage devices or disks that are being powered on and run through reliability testing in a test lab. Alternatively, the lab could be part of a data center wherein the racked assets are being used to service real-time customer requests, e.g., a data storage system that is part of a cloud-based data center.

Figure 2:
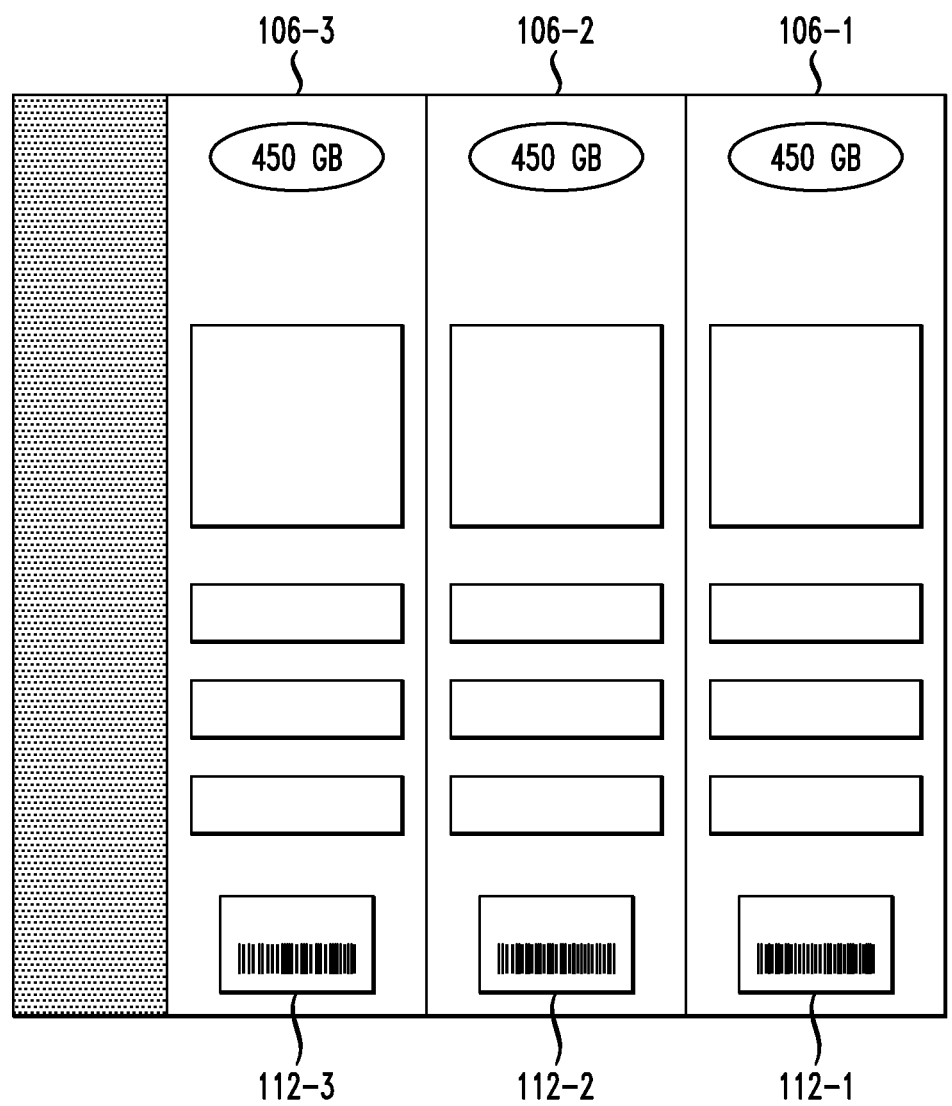
FIG. 2 illustrates a front view of racked assets with which mobile scanning techniques for inventory management according to one or more embodiments of the invention are implemented.

Also shown in FIG. 1 is a plurality of electronic equipment cabinets 104 in which one or more rackets assets 106 are installed therein. FIG. 2 illustrates a front view of a cabinet 104 in which a plurality of data storage devices 106-1, 106-2, and 106-3 are installed in a rack mounted fashion within cabinet 104.

As further shown in FIG. 1, each floor tile 102 has a tag 108 with a unique scannable identifier assigned and attached thereto. Likewise, each cabinet 104 has a tag 110 with a unique scannable identifier assigned and attached thereto. Still further, each racked asset 106 has a tag 112 with a unique scannable identifier assigned and attached thereto. FIG. 2 shows tags 112-1, 112-2, and 112-3 respectively assigned and attached to data storage devices 106-1, 106-2, and 106-3.

Figures 3, 4:
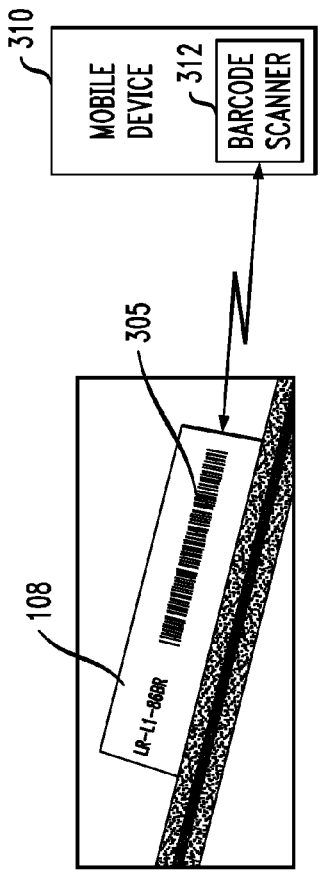
FIG. 3 illustrates a mobile scanning step according to an embodiment of the invention.
FIG. 4 illustrates a database table of associations automatically created according to an embodiment of the invention.

In one example, bar codes displayed on the tags are used as unique scannable identifiers. The bar codes can be read by a standard bar code reader available on a mobile device such as a smart phone or a tablet device. Alternatively, the mobile device may function substantially as a bar code scanner (as compared to a smart phone or tablet device which has many other functions). FIG. 3 illustrates a mobile scanning step wherein a user (not shown) scans the bar code 305 on tag 108 with a handheld mobile device 310 comprising a bar code scanner (reader) 312.

FIG. 4 illustrates a database table 400 of associations automatically created according to an embodiment of the invention. The various rows of data entries 402, 404, 406, and 408 in the database table 400 will be described in the context of a description of FIGS. 5 and 6 below.

Figure 5:
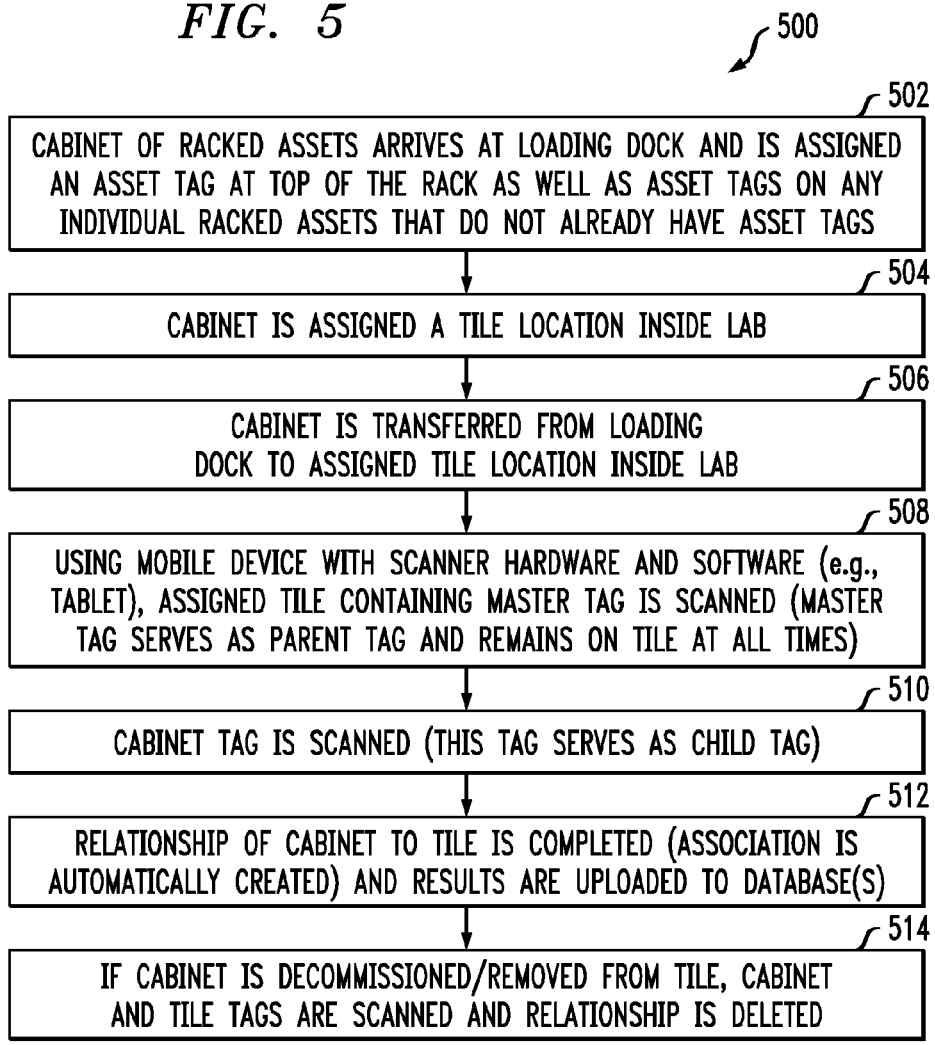
FIG. 5 illustrates a mobile scanning-based inventory management methodology according to an embodiment of the invention.

FIG. 5 illustrates a mobile scanning-based inventory management methodology according to an embodiment of the invention. The example methodology 500 assumes that the cabinet and racked assets are part of a lab environment housed in a building of a particular enterprise. However, alternative embodiments of the invention are not so limited.

In step 502, it is assumed that the cabinet 104 of racked assets 106 arrives at a loading dock and is assigned a cabinet tag 110 which is attached at the top of the rack as well as asset tags 112 on any individual racked assets 106 that do not already have asset tags. Note that the assignment of a tag to an item also includes storing in a database a correspondence between the bar code on the tag and any part number, serial number and/or other identifying indicia for the item. This data is automatically retrieved each time the tag is subsequently scanned so that it can be associated with similar data stored for another scanned item.

In step 504, the cabinet 104 is assigned a tile location 102 inside the lab 100.

In step 506, the cabinet 104 is transferred from the loading dock to the assigned tile location 102 in the lab.

In step 508, using mobile device 310 with scanner hardware and software 312 (e.g., a tablet device), the assigned tile location 102 containing a master tag 108 is scanned. More particularly, the bar code 305 on the master tag 108 is scanned. The master tag serves as a "parent" tag and remains on the tile at all times. The tile number and the bar code assigned to the tile are pre-stored for subsequent reference, as mentioned below.

In step 510, the cabinet tag 110 (bar code on the tag) is scanned. This tag serves as a "child" tag.

In step 512, the relationship of the cabinet 104 to the tile 102 is completed, i.e., an association is automatically created, and results are uploaded to a database and stored in the form of a table 400.

Thus, as shown in FIG. 4, each row of the table 400 corresponds to either the cabinet 104 (402) or one of the racked assets 106 (404, 406, 408) installed therein. For example, in row 402, it is assumed that the tag 110 of the cabinet 104 was scanned on Apr. 3, 2014 (ScanDate). It is further assumed that the initial scanning of the bar code on the tag of the cabinet results in obtaining a part number and a serial number for that particular cabinet. That is, the tag number "EMC405744" is assumed to be previously associated with serial number "JWXD12400388" and part number "100-5620712." This data is retrieved and used to populate the table as shown.

Row 402 shows the database relationship created between the cabinet and the floor tile on which it is positioned by the fact that tile tag number "LR-L1-86BR" (assumed to be previously associated with the bar code on the tile tag) is associated with the cabinet having serial number "JWXD12400388" and part number "100-5620712." Other information in row 402 specifies the building in which the particular tile resides (e.g., "Durham"), the particular lab number within the building (e.g., "L1"), the tile number "86BR," and the lab personnel who performed the scan operation (e.g., "MURTAJ").

Row 404 shows the database relationship created following tag scanning operations between a racked asset installed in the particular cabinet (in this row, a 450 GB drive having a part number "5048849" and a serial number "SAN00094205446") and the particular floor tile. Similar database relationships for other 450 GB disks having different serial numbers and the particular cabinet and floor tile are shown in rows 406 and 408.

As mentioned above, it is assumed that when a particular bar code is scanned, the system is configured to search a bar code list or table (separate from the database table 400) which stores the specific part number and serial number unique to that bar code for the given inventory item to which it is attached.

Returning to FIG. 5 and step 514, if the cabinet 104 is decommissioned/removed from the tile 102, the cabinet tag 110 and the tile tag 108 are scanned and the relationship (association) is deleted. This can mean, for example, that table 400 is deleted.

Figure 6:
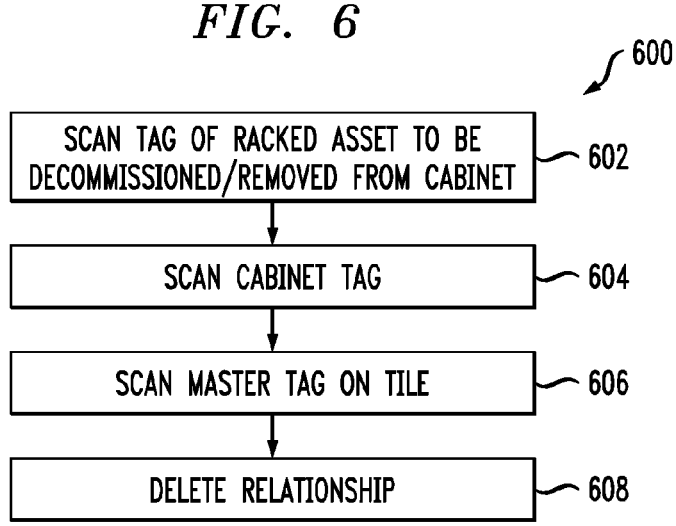
FIG. 6 illustrates a mobile scanning-based inventory management methodology according to another embodiment of the invention.

FIG. 6 illustrates a mobile scanning-based inventory management methodology according to another embodiment of the invention. In the case where an individual racked asset 106 is decommissioned/removed from the cabinet 104, the following methodology is performed.

In step 602, the tag 112 of racked asset 106 to be decommissioned/removed is scanned.

In step 604, the tag 110 of the cabinet 104 is scanned.

In step 606, the master tag 108 of the tile 102 is scanned.

In step 608, the relationship (association) is deleted from the table 400 in the database.

Thus, with reference again to table 400 in FIG. 4, assume the removed asset is the 450 GB drive referenced in row 408. Thus, row 408 would be deleted from the table when the drive is removed from the cabinet.

Accordingly, mobile scanning-based inventory management systems and methodologies as described herein provide many advantages. By way of example only, using a master asset tag for each floor tile, racked assets are automatically associated to the master tag. Further, using bar code capabilities on mobile devices such as tablets allows real-time updates to the inventory database, thus allowing a search of the database for inventory information to yield up-to-date information. Real-time automatic database changes decrease time spent on inventory management tasks. Also, the master tag approach consolidates all inventory records to one master tag per tile, thus optimizing inventory carrying costs through its accuracy and speed of delivery. Still further, the association between the master tile and all assets provides advanced trending back to the enterprise that utilizes the mobile scanning-based inventory management approach.

FIG. 7 illustrates a processing platform utilized to implement a mobile scanning-based inventory management system according to one or more embodiments of the invention. The processing platform 700 in this embodiment comprises a plurality of processing devices denoted 702-1, 702-2, 702-3, . . . , 702-K, which communicate with one another over a network 704. More or less processing devices (not expressly shown) can be part of the processing platform 700.

In one embodiment, the mobile device with bar code scanner (310/312) is represented by processing device 702-1, while one or more of the other processing devices (702-2, 702-3, . . . , 702-K) represent the database system on which the database files/tables (e.g., 400) are remotely stored. In an alternative embodiment, the database storage is maintained locally on the same processing device that performs the scanning operations. In still another embodiment, some combination of local and remote database storage may be realized.

As illustrated in FIG. 7, a processing device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor such as processor 710. Memory 712 (or other storage device) having such program code embodied therein is an example of what is more generally referred to herein as a non-transitory processor-readable (or computer-readable) storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies described above in the context of FIGS. 1-6. One skilled in the art would be readily able to implement such software given the teachings provided herein. Other examples of processor-readable storage media embodying embodiments of the invention may include, for example, optical or magnetic disks.

Also included in the processing device 702-1 is input/output (I/O) devices/network interface (IF) circuitry 714. I/O devices include one or more input devices (e.g., keyboard, keypad, mouse, touchscreen, etc.) for inputting data to the processing device, as well as one or more output devices (e.g., computer display, screen, graphical user interface, etc.) for providing results associated with the processing device. In the case where processing device 702-1 is the mobile device 310, the I/O devices 714 also include a suitable scanner such as bar code scanner 312. The network interface includes circuitry which is used to interface the processing device with a network (e.g., 704) and other network components (e.g., 702-2, 702-3, . . . , 702-K). Such circuitry may include conventional transceivers of a type well known in the art. The network 704 may be any suitable network including, but not limited to, a wireless network, a wired network, or some combination thereof.

The other processing devices 702-2, 702-3, . . . , 702-K of the processing platform 700 are assumed to be configured in a manner similar to that shown for processing device 702-1 in the figure.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of systems and infrastructure arrangements. In addition, any simplifying assumptions made above in the course of describing the illustrative embodiments should also be viewed as exemplary rather than as requirements or limitations of the invention. Still further, it is to be understood that the order in which steps (e.g., scanning, installing, positioning, etc.) mentioned herein are performed can be rearranged or altered within the scope of any described or claimed embodiment. For example, where it is stated that a first inventory item is scanned and a second inventory item is scanned, it is to be understood that this encompasses situations where the first item is scanned and then the second item, the second item is scanned and then the first item, or that the items are substantially simultaneously scanned. Numerous other alternative embodiments within the scope of the appended claims will be readily apparent to those skilled in the art.

What is claimed is:

1. A method, comprising:

assigning a plurality of tags respectively to a plurality of equipment locations, wherein each tag comprises a scannable identifier unique to each location;

assigning a tag to a first equipment cabinet, the tag comprising a scannable identifier unique to the first equipment cabinet;

positioning the first equipment cabinet at one of the plurality of equipment locations;

scanning the tag assigned to the location of the first equipment cabinet and the tag assigned to the first equipment cabinet, wherein scanning of the tags is performed via a mobile device comprising a scanner;

automatically creating an association between the unique identifier of the location of the first equipment cabinet and the unique identifier of the first equipment cabinet;

assigning a tag to a first asset, wherein the tag comprises a scannable identifier unique to the first asset;

installing the first asset in the first equipment cabinet;

scanning the tag of the first asset using the scanner of the mobile device; and automatically creating an association between the unique identifier of the first asset and the unique identifier of the first equipment cabinet, when the first asset is installed in the first equipment cabinet before the first equipment cabinet is positioned at the equipment location.

2. The method of claim 1, further comprising automatically creating an association between the unique identifier of the first asset and the unique identifier of the location of the first equipment cabinet, when the first asset is installed in the first equipment cabinet after the first equipment cabinet is positioned at the equipment location.

3. The method of claim 2, wherein a decision is made to remove the first asset from the first equipment cabinet, further comprising:

scanning the tag of the first asset, the tag of the first equipment cabinet, and the tag of the location of the first equipment cabinet; and automatically deleting the association between the unique identifier of the first asset, the unique identifier of the first equipment cabinet, and the unique identifier of the location of the first equipment cabinet.

4. The method of claim 1, wherein a decision is made to remove the first equipment cabinet from the location at which it is positioned, further comprising:

scanning the tag of the location of the first equipment cabinet, and the tag of the first equipment cabinet; and automatically deleting the association between the unique identifier of the location of the first equipment cabinet and the unique identifier of the first equipment cabinet.

5. The method of claim 1, wherein the plurality of equipment locations comprises a plurality of floor tiles.

6. The method of claim 1, wherein the first equipment cabinet comprises an electronic equipment cabinet.

7. The method of claim 1, wherein the first asset comprises an electronic device.

8. The method of claim 1, further comprising storing the automatically created association in real-time in a database file remote from the mobile device.

9. The method of claim 1, further comprising storing the automatically created association in real-time in a database file local to the mobile device.

10. An article of manufacture comprising a processor-readable storage medium having encoded therein executable code of one or more software programs, wherein the one or more software programs when executed by the at least one processing device implement the tag scanning and automatic association creating steps of claim 1.

11. A method, comprising:

attaching a plurality of parent tags respectively to a plurality of floor tiles, wherein each parent tag comprises a scannable bar code unique to each floor tile;

attaching a child tag to a first electronic equipment cabinet, the child tag comprising a scannable bar code unique to the first electronic equipment cabinet;

positioning the first electronic equipment cabinet on one of the plurality of floor tiles;

scanning the parent tag assigned to the floor tile on which the first electronic equipment cabinet is positioned and the child tag of the first electronic equipment cabinet, wherein the scanning of the parent and child tags is performed via a mobile device comprising a scanner; and automatically creating an association in a database between the unique bar code of the floor tile on which the first electronic equipment cabinet is positioned and the unique bar code of the first electronic equipment cabinet;

assigning a tag to a first asset, wherein the tag comprises a scannable bar code unique to the first asset;

installing the first asset in the first electronic equipment cabinet;

scanning the tag of the first asset using the scanner of the mobile device; and automatically creating an association between the unique bar code of the first asset and the unique bar code of the first electronic equipment cabinet, when the first asset is installed in the first electronic equipment cabinet before the first electronic equipment cabinet is positioned at the floor tile.

12. The method of claim 11, further comprising using the database to automatically determine the location of the first electronic equipment cabinet with respect to the plurality of floor tiles.

13. An inventory management system, comprising:

a mobile scanner configured to scan a tag assigned to an equipment location and to scan a tag assigned to a first equipment cabinet positioned at the equipment location, wherein each tag comprises a unique scannable identifier; and a processor operatively coupled to the mobile scanner and configured to automatically create an association between the unique identifier of the equipment location of the first equipment cabinet and the unique identifier of the first equipment cabinet;

wherein the mobile scanner is further configured to scan a tag assigned to a first asset installed in the first equipment cabinet, wherein the tag comprises a unique scannable identifier; and wherein the processor is further configured to automatically create an association between the unique identifier of the first asset and the unique identifier of the first equipment cabinet, when the first asset is installed in the first equipment cabinet before the first equipment cabinet is positioned at the equipment location.

14. The inventory management system of claim 13, wherein the processor is further configured to automatically create an association between the unique identifier of the first asset and the unique identifier of the location of the first equipment cabinet, when the first asset is installed in the first equipment cabinet after the first equipment cabinet is positioned at the equipment location.

15. The inventory management system of claim 13, wherein the equipment location comprises a floor tile.

16. The inventory management system of claim 13, wherein the first equipment cabinet comprises an electronic equipment cabinet.

* * * * *